May 19, 1964  R. T. DRAKE  3,133,769
PERMANENTLY LUBRICATED RUBBER BEARING
Filed April 13, 1961  5 Sheets-Sheet 1

INVENTOR.
ROBERT T. DRAKE
BY Eber J. Hyde
ATTORNEY

May 19, 1964 R. T. DRAKE 3,133,769
PERMANENTLY LUBRICATED RUBBER BEARING
Filed April 13, 1961 5 Sheets-Sheet 2

INVENTOR.
ROBERT T. DRAKE
BY
*Eber J. Hyde*
ATTORNEY

May 19, 1964  R. T. DRAKE  3,133,769
PERMANENTLY LUBRICATED RUBBER BEARING
Filed April 13, 1961  5 Sheets-Sheet 3

INVENTOR.
ROBERT T. DRAKE
BY
*Eber J. Hyde*
ATTORNEY

May 19, 1964 R. T. DRAKE 3,133,769
PERMANENTLY LUBRICATED RUBBER BEARING
Filed April 13, 1961 5 Sheets-Sheet 5

INVENTOR.
ROBERT T. DRAKE
BY
ATTORNEY

United States Patent Office 3,133,769
Patented May 19, 1964

3,133,769
PERMANENTLY LUBRICATED RUBBER BEARING
Robert T. Drake, Norwalk, Ohio, assignor to Clevite Harris Products, Inc., a corporation of Ohio
Filed Apr. 13, 1961, Ser. No. 103,690
4 Claims. (Cl. 308—36.1)

This invention pertains to a lubricated rubber bearing wherein the lubricant is permanently retained within the bearing. The term "rubber" is to be understood to include natural rubber and synthetic rubber-like elastomers. The term "permanent" is to be understood to mean that the bearing is not subject to periodic lubrication; i.e. no lubricant is added for the life of the bearing, and if the bearing eventually fails, it is replaced. This application is a continuation-in-part of my previous application Serial No. 665,030, filed June 11, 1957, for Lubricated Rubber Bearing, and is also a continuation-in-part of my previous application Serial No. 699,293, filed November 27, 1957, for Permanently Lubricated Rubber Bearing, both now abandoned.

In the past rubber bearings and bushings have been made consisting of two concentric, spaced-apart metal sleeves with rubber between the two sleeves in such a manner that relative rotary motion between the sleeves caused shear in the rubber. The rubber was bonded to both of the sleeves or adhered to them by either a chemical bond or a frictional bond, or by a combination of the two bonds. Units having a high frictional bond or adherence often used a temporary lubricating material during assembly when the rubber sleeve was "shot" into the metal sleeves. Almost all of this temporary lubricating material was squeezed out during assembly and the remainder of the lubricant was adsorbed by the rubber within a short period of time, resulting in a device which had the desired high frictional forces or adherence between the rubber and the sleeves when it was put to its intended use.

Bearings and bushings made with these techniques have been successfully used extensively in automotive construction, especially in front suspension control arm pivot joints, shock absorber pivotal joints, steering linkage bushings, rear suspension linkage bushings, and the like.

The aforedescribed rubber bearings have inherent high torsional spring-rate characteristics, evidenced by the fact that if either of the two sleeves was rotated torsionally with respect to the other sleeve, forces would build up in the rubber which would try to return the sleeves to their original positions.

The inherent torsional spring-rate characteristic has created problems and limitations in designing automotive chassis linkages for particular ride qualities, and accordingly there is a need for a low-cost rubber bearing which retains all of the desirable features of the previous rubber bearing, but which has low torque or spring rate characteristics.

While the automobile chassis linkage is the first commercial application of the lubricated rubber bearing of this invention, the bearing has such excellent qualities that many other fields are open to its use, and whereas the description of the invention is directed to automotive applications it is to be understood that this is by way of explanation and is not to be construed as limiting the use of this bearing to the automotive field.

It is an object of the present invention to provide a sleeve or a ball type rubber bearing or bushing which has a very low inherent torsional spring rate, yet which retains all of the desirable features of rubber bearings in regard to deflection, shock isolation, noise reduction, etc.

It is an object of this invention to provide a rubber bearing having substantially no torsional spring rate and having a very low coefficient of friction.

It is also an object of one form of this invention to provide a metal-rubber bearing having a low coefficient of friction and having an accurately controlled, low torsional spring rate which is initially designed and built into the bearing, the bearing thereafter throughout its long service life maintaining that low torsional spring rate.

It is an object of the present invention to provide a sleeve-type rubber bearing or bushing which has no inherent torsional spring rate, yet which retains all of the desirable features of rubber bearings in regard to axial and radial deflection, shock isolation, noise reduction, etc.

It is an object of the invention to provide a rubber sleeve bearing having substantially no torsional spring rate and having a very low coefficient of friction.

A further object of the invention is the provision of a rubber sleeve bearing permanently containing a supply of lubricataing material sealed into the unit, whereby for the life of the unit no additional lubricant need be, or can be, added.

Still another object of the invention is the provision of a permanently lubricated rubber bearing capable of carrying radial loads and which will withstand axial thrust in either one or both directions.

Further objects of the present invention are to provide specific bearing designs utilizing rubber or rubber-like materials and lubricating material permanently built into the units.

Still another object of the invention is to provide a rubber-metal bearing wherein there is lubricant sealed within the unit and filling substantially all of the space therein to establish a pumping action within the bearing due to loads applied thereto.

For a better understanding of the present invention, together with other and further objects thereof, reference is had to the following description taken in connection with the accompanying drawings, and its scope will be pointed out in the appended claims.

An aspect of the invention lies in the provision of a permanently lubricated bearing which comprises a rigid housing member having a load-bearing face which is either its inner or its outer face, and a rubber-like material which has its load-bearing face in engagement with the load bearing face of the housing member for load-bearing support therebetween. The load bearing face of the rubber-like member is recessed, as by grooves, dimples or the like, so that when the two load-bearing faces are together the recessed area is free from contact with the other member thereby defining a volume between the two load-bearing faces. Permanent lubricating means substantially fill this volume for permanently lubricating the engaging portions of the two load-bearing faces, and sealing means are at the edges of the load-bearing faces to permanently seal the lubricating material between the rubber-like member and the housing member.

Another aspect of the invention lies in the provision of a bearing which comprises an inner member and an outer member spaced therefrom for relative motion therebetween. A rubber sleeve is mounted between the inner and outer members and is secured to only one of the members to prevent rotary motion between the rubber sleeve and said one member. A lubricant of the permanent type is positioned between the rubber sleeve and the other member and sealing means are provided between the rubber sleeve and the other member at each end of the bearing to prevent the egress of the lubricant and to prevent the ingress of dirt into the lubricant.

With reference to the drawing there is shown in FIG-

URE 1 a longitudinal cross-sectional view of a lubricated rubber bearing in a typical mounting;

FIGURE 2 is a sectional view of a portion of the unit with the outer metal tube removed;

FIGURE 3 is a longitudinal cross-sectional view of a modified form of the invention particularly adapted to resist thrust in two directions;

FIGURE 4 is a sectional view of a portion of the unit shown in FIGURE 3;

FIGURE 5 is a sectioanl view taken along lines 5—5 of FIGURE 4;

FIGURE 6 is a sectional view showing a modified type of lubricant retaining groove;

FIGURE 7 is a fragmentary view showing a modified form of the device shown in FIGURES 3 and 4;

FIGURE 8 is a sectional view taken along line 8—8 of FIGURE 3;

FIGURE 9 is a sectional view showing a modified form of the invention;

Figures 1, 2, 3, 4, 5, 6, 7, 8, 9:
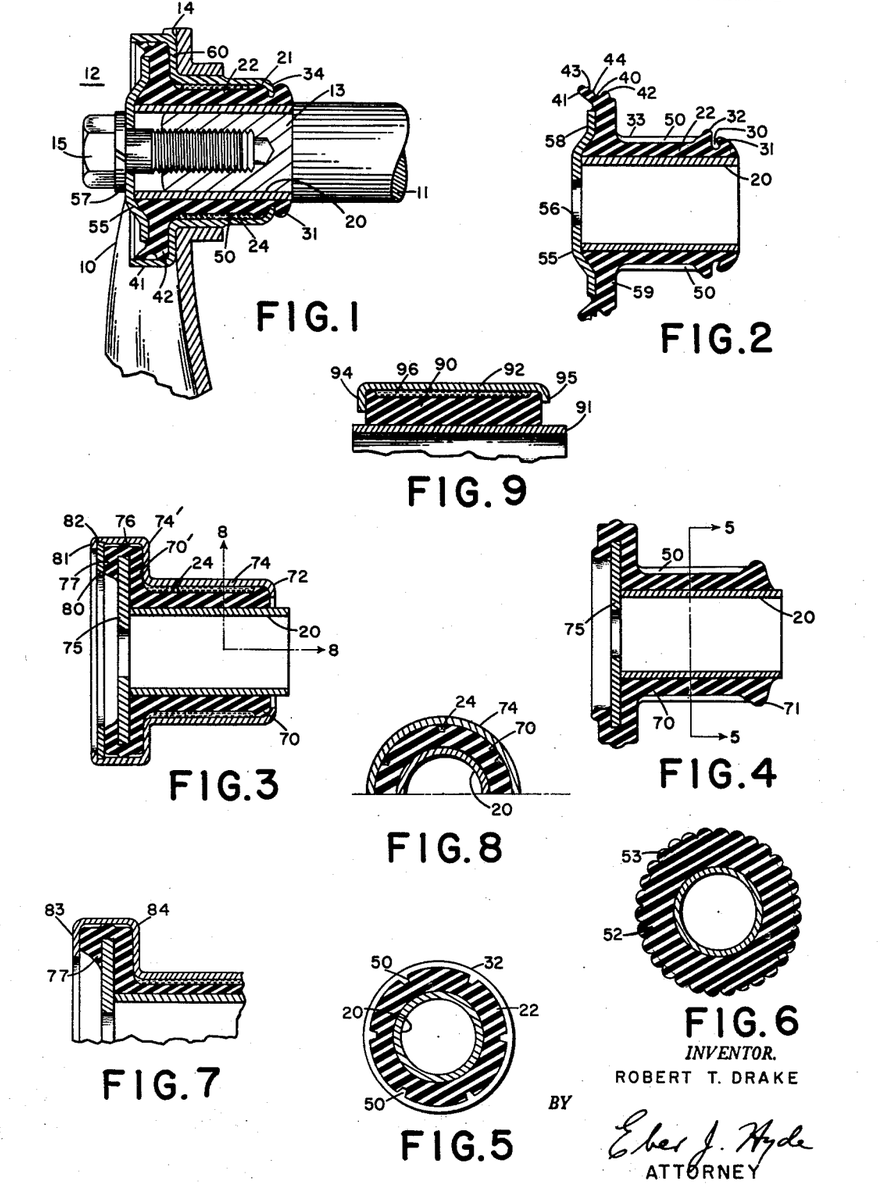

The permanently lubricated rubber bearing of the present invention is shown in FIGURE 1 mounted to connect and form a pivotal joint between the upper control arm 10 and the control arm shaft 11 in a typical automotive suspension installation.

The bearing unit, identified by reference character 12, is hollow and fits around a reduced end portion 13 of the control arm shaft 11, and by a force fit is held in close engagement with a shoulder 14 of the upper control arm 10. The reduced end portion 13 of the control arm shaft 11 is bored and threaded, and a bolt 15 extends into the bearing unit 12 into threaded engagement with the control arm shaft 11, thereby locking the bearing unit in place.

The bearing unit 12 must be hollow for the application shown in the drawing, but for other applications this is not essential. As shown, the bearing is comprised of a hollow inner sleeve member 20 preferably formed of metal and a concentric hollow outer sleeve member 21 also preferably formed of metal. A rubber sleeve 22 is mounted between the concentric metal sleeves 20, 21, and preferably is secured to only one of the sleeves to prevent relative rotary motion between the rubber sleeve and the one metal sleeve to which it is secured. In the device shown, one face of the rubber sleeve 22 is bonded or otherwise affixed to the inner metal sleeve 20, and rib portions 23, of the other face is in direct, lubricated, load bearing engagement with the other metal sleeve 21.

A lubricant 24 is positioned between the O.D. of the rubber sleeve 22 and the I.D. of the metal sleeve 21 to provide for permanently lubricating the area of contact between the rubber sleeve 22 and the outer metal sleeve 21. Upon the application of a torsional force being applied to the outer sleeve 21 the built-in permanent lubricant causes the outer sleeve 21 to slip relative to the rubber sleeve 22 with very low frictional resistance, and since there is substantially no distortion in the rubber as the slippage takes place, there is substantially no spring force built up in the rubber urging the unit to spring back to its original position. In other words, due to the lubrication and slippage the unit has substantially no torsional spring rate.

Sealing means are provided at each end of the bearing to prevent the escape of the permanent lubricant and to prevent dirt from working into the lubricated area. The sealing means shown in FIGURES 1–4 are located between the rubber sleeve 22 tnd the outer metal sleeve 21, and there is one at each end of the unit. The sealing means at the right-hand end of the unit is comprised of the annular groove 30, the upwardly and inwardly extending lip 31 at one side of the groove 30, and the bead 32 which extends around the unit above the level of the lubricated surface 33. The end 34 of the outer metal sleeve 21 turns inwardly into the groove 30 and the bead 32 is in close pressure contact with the inside surface of the sleeve 21, forming a pressure seal to retain the lubricant. The inwardly extending lip 31 engages the outer surface of the inwardly turned end 34 and establishes a seal which prevents the entry of dirt and which helps to prevent the escape of the lubricant. At the other end of the unit the sealing means comprise a groove 40, an upwardly extending lip 41 and a bead 42, as shown in FIGURE 2. The lip 42 has two sharply pointed annular ridegs 43, 44 establishing point contact with the metal sleeve to increase local pressure between the rubber sleeve 22 and metal sleeve 21 without establishing high frictional forces therebetween. When assembled, as shown in FIGURE 1, the bead 42 is in close pressure engagement with the inside surface of a portion of the outer sleeve member 21, and the sharp annular ridges on the upwardly extending lip 41 are in resilient contact with the inside surface of the sleeve 21 establishing oil and dirt seals. Thus, the unit shown in FIGURES 1 and 2 has at each end a double seal.

To assure a supply of lubricant within the unit, a plurality of grooves 50 are provided around the circumference of the rubber sleeve 22. When assembled, these grooves 50 contain a supply of lubricant, and as relative motion takes place between the outer metal sleeve 21 and the rubber sleeve 22 the lubricant is continuously applied to a wide area of contact between the slipping parts.

The particular lubricant used should be chosen to be dependent upon the type of rubber-like material used. The lubricant should not react chemically with the rubber nor with the metal with which it comes in contact. Also, the lubricant should not be adsorbed in the rubber throughout the life of the bearing, and it should act as a proper lubricant throughout the range of ambient temperatures expected in service.

Examples of lubricants suitable for use with natural and reclaimed rubber are: silicone, Carbowax, castor oil, and Ucon 50 HB.

When the elastomer is styrene butadiene rubber (GRS), recommended lubricants are silicone, Carbowax, or Ucon 50 HB.

When the elastomer is a nitrile rubber such as Hycar or the like, recommended lubricants include polybutene, petrolatum and silicone.

For neoprene rubber the recommended lubricants are polybutene, petrolatum, silicone and castor oil. For butyl rubber it is recommended that silicone, Ucon 50 HB or castor oil be used.

For a silicone type elastomer Ucon 50 HB or Carbowax may be used.

"Carbowax" is a trade name for polyethylene glycol.

"Ucon 50 HB" is a trade name for polyaklylene glycols and their derivatives.

"Neoprene" is a chloroprene rubber.

The lubricant should be able to flow, that is, it should have no elastic limit. Materials such as nylon, Delrin, Teflon, etc., having elastic limits, are not suitable for the purposes of this invention, and are not lubricants within the meaning of the term as herein used.

The rubber-like material should not absorb the lubricant, nor should it be porous because as the pores become stopped up with dirt adequate lubrication is lost.

A washer 55 having a bolt hole 56 is provided to facilitate assembly of the bearing unit between the control arm 10 and the control arm shaft 11. The washer 55 is concentric with the hollow sleeve 20 and the hole 56 accommodates the assembly bolt 15. A lock washer 57 may be used. The washer 55 has a flange portion 58 which extends radially outwardly and whose inner face is bonded to a flange portion 59 of the rubber sleeve 22. Thus, the bearing unit as sold for automotive control arm use may comprise the rubber sleeve 22, the inner and outer sleeves 20, 21 only one of which is bonded to the rubber sleeve, and the end washer 55 bonded to the rubber.

For installation as shown in FIGURE 1 it is required that the unit be able to resist axial thrust in one direction. This is achieved by the provision of the flange 59 in the rubber sleeve 22, and by having a radially extending flange portion 60 in the outer metal sleeve 22. One face of the rubber flange 59 lies against the flange 60 of the sleeve 21 and the other face against the washer 55. The O.D. of the washer 55 is appreciably greater than the I.D. of the flange 60 of the sleeve 22 so that there is established an overlap between the washer 55 and the flange 60. Axial motion between the washer 55 and the outer sleeve 22 tending to move them toward each other will be resisted by compression of the rubber therebetween.

FIGURES 3 and 4 show a lubricated rubber bearing adapted to take thrust in two directions. The rubber sleeve member 70, shown in FIGURE 4, terminates in a sealing bead 71, and when assembled, as shown in FIGURE 3, the downwardly turned end 72 of the metal sleeve member 74 overlaps the bead 71 establishing the lubricant and dirt seal at one end of the unit. Only a single seal is shown at each end of this unit, but it is to be understood that a double seal, as shown in FIGURE 1, could also be used.

At the opposite end of the unit a washer 75 is bonded to the rubber member 70, and it extends radially outwardly, as previously explained, into an overlapping position with respect to the radial portion 74' of the outer metal sleeve 74, with a radial portion 70' of the rubber member 70 positioned therebetween. The annular rubber flange 70' has a peripheral portion 76 and has a reverse or reentrant portion 77 integral therewith extending radially inwardly toward the inner sleeve member 20. A thrust collar 80 is held against the outside face of the reentrant portion 77 by the outside sleeve member 74 which has an inwardly turned lip 81 having a notch 82 in its I.D. in which the collar 80 is positioned. Thrust in either direction between the inner and outer sleeves 20, 74 will be transmitted to the portion of the rubber sleeve 70 on one side or the other of the washer 75.

In the device shown in FIGURE 6 the rubber member 52 has a plurality of scallops on its outside surface, forming a plurality of lubricant retaining grooves to facilitate the even distribution of lubricant to the walls of the metal member with which it is to be assembled, and the ridges 53 are rounded where they engage the outside metal member to better distribute lubricant on the metal surface and to reduce or eliminate a "squeeze" or wiping action which tends to reduce the lubricant film thickness.

FIGURE 7 shows a modified form of device for resisting axial thrust, wherein one end 83 of the outer metal sleeve 84 is folded inwardly on the reentrant portion 77 of rubber sleeve 70, thus obviating the thrust collar 80 shown in the device of FIGURE 3.

FIGURE 9 shows still another modified form of the invention wherein a rubber sleeve 90 is chemically or frictionally bonded to an inner metal sleeve 91, and an outer metal sleeve 92 is positioned around the rubber sleeve 90. The ends 94 and 95 of the outer metal sleeve extend around the ends of the rubber sleeve 90 to hold the unit together and to seal in the permanent lubricant in the groove 96 of the rubber sleeve 90. With the sleeve ends 94, 95 folded around the rubber sleeve 90 the unit will take limited thrust in either direction axially. As shown, the sleeve end 94 folds around the rubber sleeve to a greater extent than does the end 95. This permits the unit to be assembled by funneling the rubber sleeve 90 into the preformed outer metal sleeve 92 for rapid assembly.

Figure 10:
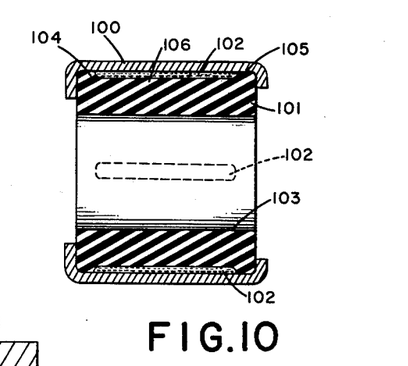
FIGURE 10 shows a very simple type of bearing incorporating the features of this invention.

FIGURE 10 shows a very simple, inexpensive form of the invention having a small, fixed amount of spring rate. In this embodiment there are only three separate physical elements needed to form a permanently lubricated bearing of excellent characteristics and life. They are a housing portion 100, a rubber portion 101, and permanent lubricating material 102 trapped in a plurality of spaced locations between the housing 100 and the rubber portion 101. There does not need to be an inner housing member within the bore 103 of the rubber member 101 as the purchaser, such as the auto manufacturer, may supply this portion. Also, the unit as sold may have the housing member which cooperates with the rubber-like member to contain the lubricant located within the bore instead of outside of the member as illustrated.

The sealing portions at the edges between the housing 100 and the rubber-like member 101 may be of the type shown in FIGURES 1, 2, 3, 4, 7 and 8, or, as illustrated in FIGURE 10, the end seals may be constituted by rubber portions 104, 105 whose thickness in an unassembled condition is sufficiently greater than the thickness of the intermediate portion 106 to establish, when assembled, compressive forces on portions 104, 105 sufficient to frictionally bond the surface of the rubber at locations 104, 105 to the inside surface of the housing 100 and thus to seal the lubricant within the space located between the housing 100 and the central portion 106 of the rubber-like material. Such a construction results in a bearing having a spring rate which is very low compared to previous bearings wherein the rubber was compressed between two members, and because of the novel application of the permanent lubricant between the ends 104, 105 the combined frictional and torsional forces against turning are quite small. The space for the lubricant 102 may be in the form of grooves running axially of the rubber member 106, or the groove can run circumferentially around the member 106. In such a construction the load bearing capacity of the bearing is considerable since the areas of the end portions 104, 105 are always in contact with the inner face of the housing 100 for the transfer of light to moderate loads. However, when a heavy load occurs radially of the unit slightly increased area of the rubber-like material comes into contact with the inside face of the housing, with a consequent squeezing action which expels the lubricant 102 from the grooves aligned in the direction of the load. This lubricating material flows between the rubber-like material and the housing to locations 90 degrees around the unit from the loaded top and bottom portions, thereby lubricating the load transmitting surfaces. Thus, for a bearing unit which has changing load forces applied to it, there is a continuous pumping action which continuously forces the lubricant across the load-bearing faces. Under the shaking that road irregularities create in an automobile, variable radial loads are applied to the bearing units at frequencies such that the pumping action is intense and continuous and a flow of silicone or similar lubricant is forced between the load bearing surfaces. It is also possible that load reversals may occur under certain road conditions, which will cause most severe lubricant distribution or "pumping action."

This principle of forced permanent lubrication is applicable to all of the bearing units herein described, and for maximum pumping action it is desirable that all of the spaces between the rubber-like members and their housings initially be substantially filled with the permanent lubricating material.

Figure 11:
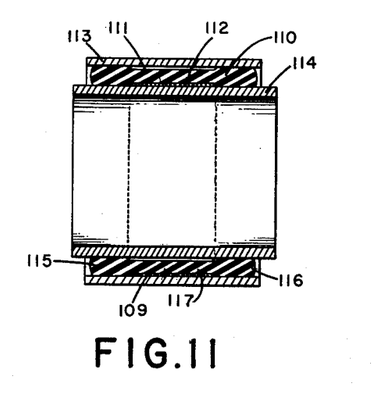
FIGURE 11 is a longitudinal sectional view through a modified type of lubricated bearing having a fixed, low spring rate.
Figure 12:
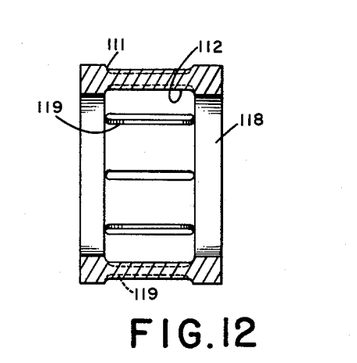
FIGURES 12 and 13 are modified types of rubber-like inserts for the device shown in FIGURE 11.
Figure 13:
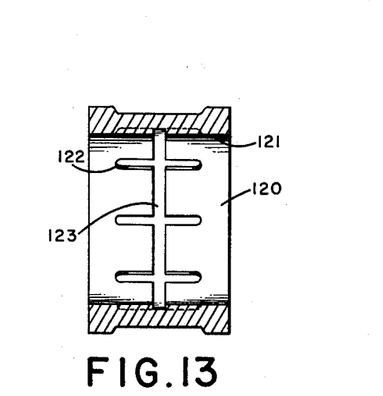

FIGURES 11, 12 and 13 show other variations in the bearing of the present invention. Reference character 110 represents a rubber-like member having one or more grooves 111, 112 extending completely around its outside diameter face and around the inside diameter face. An outer housing 113 is provided and inside the rubber-like member 110 there is an inside housing member 114. In the embodiment shown in FIGURE 11 the rubber-like member 110 is adapted to slip with respect to both housing members 113 and 114, but it is to be understood that the invention may be practiced by having the member 110 slip with respect to only one of the housing members, in which event the only groove needed is the one between the rubber member and the housing with respect to which it is to slip. Also, it is within the scope of the invention to have the user of the device supply one or the other of the housing members, as was explained in connection with FIGURE 10.

Only the end portions 115, 116 of the rubber-like member 110 are normally under compression in the assembled device, the center portion 117 being free from compression except when heavy loads are applied across the bearing. In this event the area of the rubber-like member in contact with the housing members is suddenly greatly increased, thereby enabling the bearing unit to handle heavy loads. The end portions 115, 116 are always under compression, thereby, as in FIGURE 10, sealing the lubricant 109 inside the grooves 111, 112 and to a certain small degree giving to the bearing a determinable small amount of spring rate which in many applications is desirable. The amount of spring rate designed into the unit is a function of the degree of compression of the end portions 115, 116 of the rubber-like member, the area of the end portions in permanent engagement with the housing members and the qualities of the rubber-like material.

FIGURE 12 shows a modified form for the rubber-like member. In addition to having shallow grooves 111, 112 extending around its exterior and interior faces the member 118 has separate lubricant storage grooves 119 in its inner and/or outer faces.

In the embodiment shown in FIGURE 13 the rubber-like member 120 has a smooth bore 121 except for the horizontal lubricant storage grooves 122 which are connected together by an annular groove 123.

Figure 14:
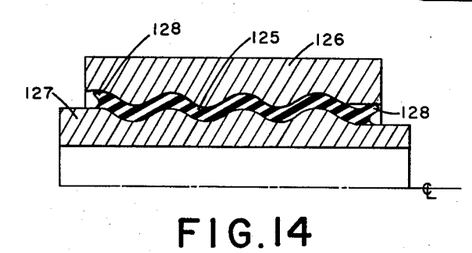
FIGURE 14 shows by a sectional view a portion of a device wherein the rubber-like element is in the form of a screw thread.

FIG. 14 shows a rubber-like member 125 between two housings 126, 127; the inner faces of the housing portions being in the form of a screw thread and being spaced apart from each other with the rubber-like member being positioned between them. Grooves or dimples may be located in either or both of the inner faces of the housing members, or the grooves or dimples may be in either or both of the faces of the rubber-like member 125 to accommodate a permanent lubricant, and sealing means 128 are provided at either end of the member 125 to seal the lubricant in place.

Figures 15, 16, 17, 18:
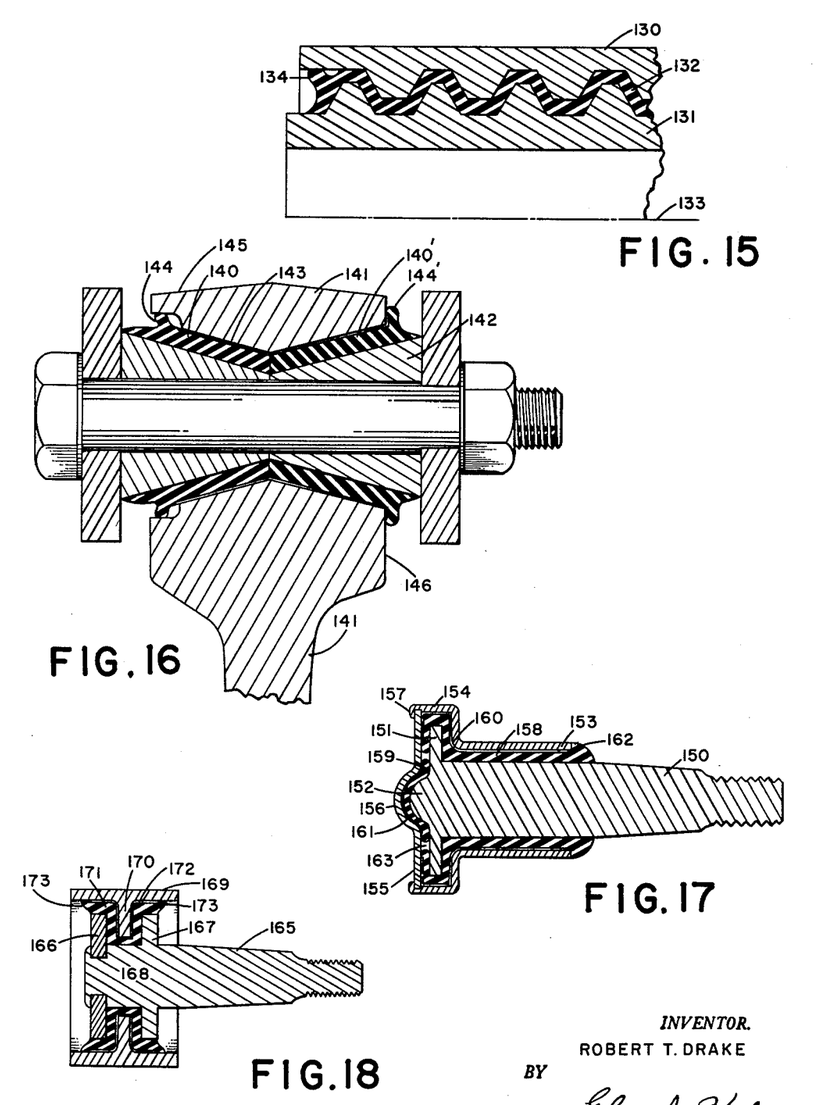
FIGURE 15 is a sectional view of a portion of a device wherein the rubber-like element is corrugated in cross section.
FIGURE 16 is a sectional view showing the principle of the invention applied to a doubly tapered bushing.
FIGURE 17 is a sectional view of an end-thrust device embodying the invention.
FIGURE 18 is a sectional view of a device for taking thrust in two directions and embodying the invention.

FIGURE 15 shows a device somewhat similar to the device shown in FIGURE 14, except that the two housing members 130, 131 have corrugated threads rather than screw threads, and consequently either the inner or outer housing member 130, 131 or both, should be split along the center-line 133 to facilitate assembly of the unit. As in the previously described unit permanent lubricant is located in grooves or dimples between the corrugated rubber-like member 132 and either one or both of the housing members, and sealing means 134 are provided at the edge surfaces to seal the lubricant in place. Splitting along the center line 133 can be avoided by using a threaded joint as shown by Canadian Patent 499,449, to Decourdemanche.

FIGURE 16 shows the invention applied to a tapered bushing, the two tapered rubber-like members 140, 140' being located between the arm 141 and the core 142. As shown, lubricant grooves 143 preferably along generatrixes of the cones are provided between the rubber-like members and the arm 141, and two different types of sealing means 144, 144' are provided at the edges for retaining the permanent lubricating material in the grooves 143. Seal 144 acts against the underneath surface of an overhang 145, and seal 144 acts against the edge surface 146 of the arm 141.

FIGURE 17 shows the invention embodied in a unit capable of taking end thrust, such as for rod end bearings. The unit comprises the threaded rod 150 having an integral end ball 152. The housing around the unit comprises a tubular portion 153 having an enlarged portion 154, and an end plate 155 having a centrally located spherical portion 156. The end 157 of the enlarged portion 154 is turned over to hold the end plate 155. A first rubber-like member 158 is located between the tubular housing 153 and the rod 150, and a second rubber-like member 159 is located between the end ball 152 and the spherical portion 156 of the end plate 155. Space 163 is provided between the two rubber members 158, 159 to allow for displacement of the rubber during assembly and during operation, and also to accommodate a supply of lubricating material. It is within the scope of the invention to make rubber members 158, 159 in a single piece, in which event corrugations or oil grooves should be provided to accommodate rubber displacement. As shown, a plurality of lubricant grooves full of lubricating material 160 are provided between the housing 153, 154 and rubber-like member 158 to facilitate the turning of the rod 150 with respect to the housing, and a lubricant groove 161 is provided between the rubber-like member 159 and the spherical portion 156 of the end plate 155. Sealing means 162 are provided between the rod 150 and the end of the housing 153 to retain the lubricant within the unit. During continuous operation of the unit over long periods of time, heat may tend to expand the rubber member causing undue internal pressure. The rubber member, being discontinuous, has space 163 to accommodate the enlargement, thereby keeping the internal pressure down to a reasonable amount.

FIGURE 18 shows a modified type of unit capable of taking end thrust, wherein the rod 165 has integral with it, or connected to it, two collars 166, 167 spaced apart by the intermediate portion 168 of the rod. The tubular housing 169 has an inwardly extending annular collar 170 located midway between the two collars 166, 167, and a rubber-like member 171 is positioned between the housing 169 and the rod 165, and extends around the annular collar 170 is such a manner to position a thick layer of the rubber-like material between the housing and the rod. Spaced apart lubricant containing grooves 172 are provided, preferably located between the rubber-like member 171 and the housing to facilitate the relative rotation of the rod and housing members, and sealing means 173 are provided at the edges where the rubber-like member engages the housing 169 to assure that the lubricant will permanently be retained within the sealed unit.

The modifications of the invention shown in the first 18 figures of this specification are all sleeve bearings of one form or another. As illustrated, the rubber member may be secured by friction or by bonding to one or the other of the metal members, but it is also within the scope of the present invention to have the rubber member substantially free from tight engagement with both metal members so that relative motion takes place between the rubber member and both metal members. Throughout the description of the sleeve bearings there has been shown and described scallops and grooves in the surface of the rubber member which is to slip with respect to a metal member. It is to be understood that any other physical configuration which will cause the retention of lubricating material may be used. Thus the surface of the rubber unit may contain a plurality of dimples, or it may have a number of raised areas between which the lubricating material may be stored.

FIGURES 19 to 23 show the principle of the invention applied to various types of ball joints.

Figure 19:
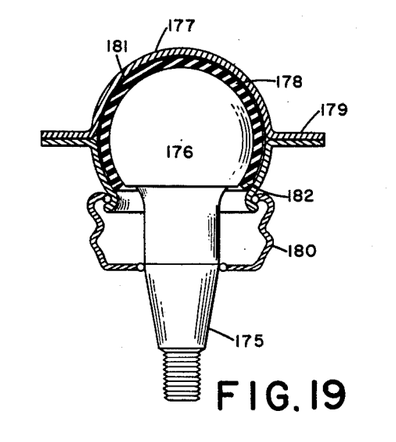
FIGURES 19, 20, and 21 show the inventive principle applied to ball joints of several types.

In FIGURE 19 there is shown a ball stud 175 having a ball 176 at one end. Around the ball 176 is a two-part spherical housing 177, spaced from the ball 176, and with a rubber-like member 178 therein. The two-part housing is secured together after assembly around the ball and rubber-like material by welding, bolting or otherwise connecting together the flanges 179, and a sealing device 180 is secured around the lower end of the housing and around the rod 175 to exclude dirt etc. Lubricant-containing grooves 181 are provided on the outer surface of the rubber-like member 178, and when the unit is assembled permanent lubricating material fills the grooves 181. Sealing means are provided at the edge of the rubber-like material 178 for retaining the lubricant. The rubber-like material 178 may be bonded to the surface of the ball 176, or as shown in FIGURE 20 the rubber-like material 185, 186 may be in two parts bonded respectively to the two housing parts 187, 188 and the lubricant grooves 181 may be in the rubber-like material adjacent the surface of the ball 176.

Figure 21:
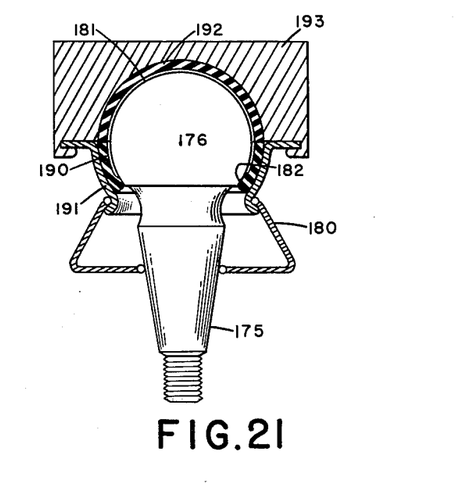

FIGURE 21 shows a ball joint wherein the rubber-like material is in two parts with one part 190 bonded to the housing member 191, and with the outer part 192 frictionally bonded to the housing member 193.

Figure 20:
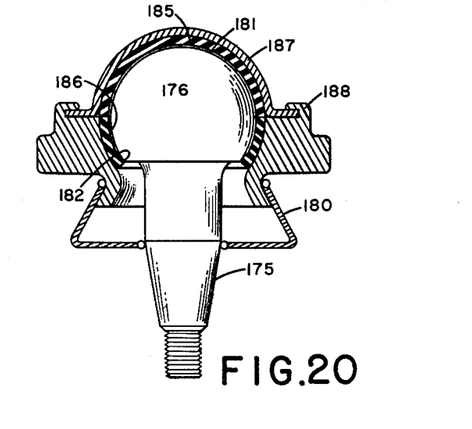

In the devices shown in FIGURES 20, 21 where two-part rubber-like members are used the lubricating groove in the two parts preferably should be aligned with each other to facilitate the movements of the lubricating material within the unit.

Figure 22:
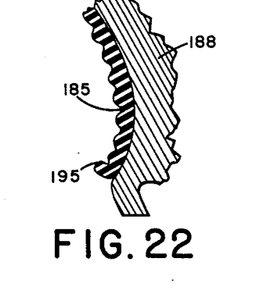
FIGURE 22 shows a detail of the seal used with the ball joints of FIGURES 20 and 21.

FIGURE 22 shows an enlarged detail of the seal 182 in its uncompressed state prior to assembly of the unit. A simple and inexpensive way to provide the seal is to have the edge portions 195 of the rubber-like material of substantially greater thickness than the remainder of the rubber-like material. Upon assembly this portion is compressed between the ball member 176 and the adjacent portion of the housing thereby establishing around the base of the ball a zone of high pressure rubber which prevents the lubricant from leaking out of the sealed unit. Also, as shown in FIGURE 22, the inner surface of the rubber member may be scalloped to establish a plurality of lubricant retaining depressions 185.

Figure 23:
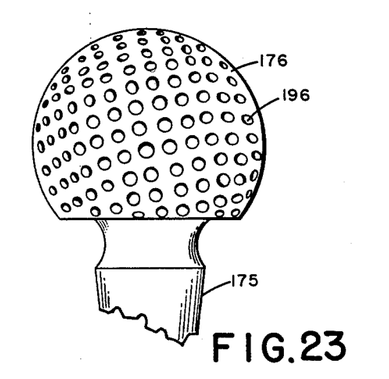
FIGURE 23 is a sectional view taken through the rubber-like bearing member of a ball and socket joint.

While it is desirable for either the inner face or the outer face or both faces of the rubber-like member to contain the lubricant receiving grooves or dimples, it is preferable, as shown by FIGURE 23, that the inside face of the rubber-like bearing means be provided with the grooves, or with the dimples 196 for the reception and retention of the permanent lubricating material.

Extended tests have shown that maximum utility is achieved by rubber-like sleeve bushings of the general types shown in FIGURES 24 to 30.

When the rubber sleeve is molded and before it is assembled between the inner and outer load bearing metal members, its load bearing rings or scallops 53 should be rounded, and its load bearing axially extending ridges or ribs 23 also should be rounded. In the assembled device this assures the presence of lubricant between each of the load bearing rings and ridges and the load bearing metal tube member during operation.

When the rubber sleeve is assembled there is an interference fit between the rings and ridges and the metal tube member. The magnitude of this interference fit should be such that the total of the static load and the maximum dynamic load to be experienced by the unit does not cause any portion of the load bearing rings or ridges to break away from its contacting tube member. In other words, it is important that all load bearing rings and ridges remain in engagement with the tubular member at all times. Load variation will change the area of the engagement between rubber and tube, and this variation is depended upon to supply fresh lubricant to those portions of the rubber which are in engagement with the tubular member. The ribs 23 restrict or prevent free circulation of the viscous lubricant around the sleeve member. This action is essential in installations where the bushing is apt to be unused over a period of time, as in an automobile which is not used for several months. In such applications it is important to have a large plurality of distributed relieved areas in the surface of the rubber sleeve member, each area defining a pocket 25 to receive and hold viscous lubricant. As shown in FIGURES 26, 27, 28 and 29 various forms are recommended.

One of the major problems which has been solved by the hereindescribed invention, especially in connection with automotive applications, is the problem of "stiction."

Figure 30:
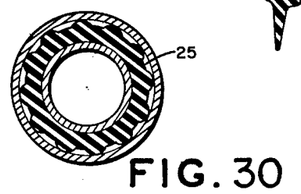
FIGURE 30 is a sectional view taken along line 30—30 of FIGURE 29.

"Stiction" is the highly undesirable tendency of an unlubricated rubber member to stick to another member against which it is compressed, with consequent high frictional forces involved in breaking the rubber away from the other member. In brief, it is a high static frictional force evident when one tries to break the rubber sleeve away from the metal sleeve. "Stiction" leads to early failure of rubber-to-metal bushings where relative motion is desired between a rubber surface and a metal surface. To reduce or eliminate this "stiction" a large number of lubricant pockets 25 are distributed around the rubber bushing and all of the load bearing surfaces are (in their unloaded state) rounded to facilitate lubricant reaching the load bearing areas of the rings 53 and ridges or ribs 23. Even after assembly, as shown in FIGURE 30, it is advisable that the loaded ribs and rings retain a small amount of the rounded aspect.

Another factor which is important to the reduction or elimination of "stiction" is the stiffness of the rubber. The stiffer the rubber, the faster the break-away with consequent better lubrication and less "stiction." However, the stiffness of the rubber in the rings and ribs must be correlated to the thickness of the rubber which forms the bottom of the pockets in order to prevent the rubber in the rings and ribs from flowing under load into the pockets to the extent that it drives out the lubricant. The thinner the rubber forming the bottoms of the pockets, the harder it is for the ring and rib rubber to flow into the pockets and drive out the lubricant. Also, it has been determined that it is preferable to have the bottoms of the pockets as thin as possible because the thinner the rubber the quicker the break-away. With these general directions one can design an inexpensive, substantially permanent, sealed, rubber-to-metal bearing which exhibits long life, low friction and low spring rate.

Figure 24:
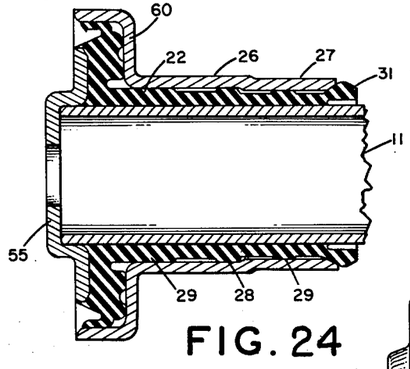
FIGURE 24 shows the invention applied to a control arm bushing wherein the outer metal sleeve is of two different diameters.
Figure 25:
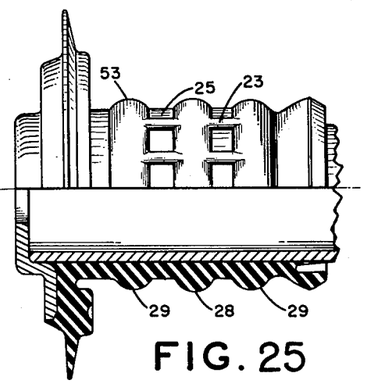
FIGURE 25 is a view, partly in section and partly from the side, showing the configuration of the rubber bushing used in the device shown in FIGURE 24.
Figure 26:
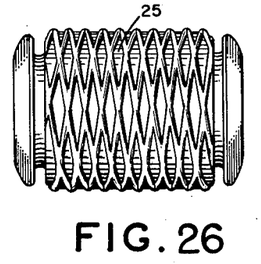
FIGURES 26 to 29 inclusive show forms of the invention which have been developed.
Figure 27:
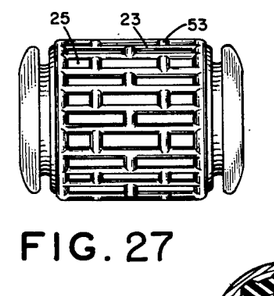
Figure 28:
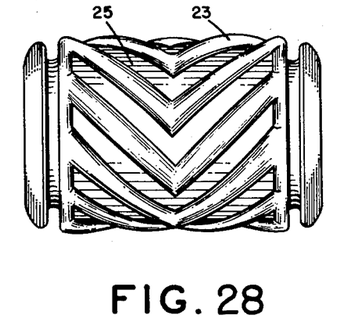
Figure 29:
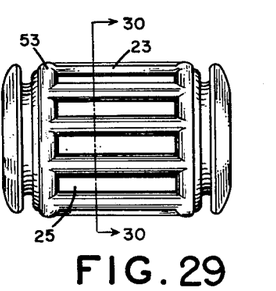

Another factor which has been discovered involves a bushing of the type shown in FIGURE 24 wherein the outside metal member has two different diameters 26, 27. Such a bushing may be typically used in automobile front-end suspension systems. A rubber bushing of the type shown in FIGURE 25 should be used. It has a load bearing sealing ring 28 intermediate the two end rings 29, and this intermediate ring 28 is located adjacent the discontinuity in the internal diameter of the outside load bearing member in order to prevent the viscous lubricant from migrating from one end zone to the other end zone.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What I claim is:

1. A bearing for rotary motion comprising,
an inner member,
an outer member around said inner member and spaced therefrom, rubber-like bushing means compressed between said inner and outer members for transmitting load from one of said members to the other, said rubber-like bushing means having on one major face thereof a plurality of rounded load bearing ribs integral therewith, said rounded ribs being in direct load bearing engagement with one of said members for lubricated sliding motion in respect thereto during said rotary motion and each space between said ribs defining a lubricant receiving pocket, lubricant pocket sealing means integral with said rubber-like bushing means and located within the confines of said members and in sealing engagement with said one of said members whereby lubricant within each of the pockets is substantially permanently retained within said pocket, viscous lubricant located in said pockets between said ribs whereby upon said rotary motion of said bushing in respect to said one member said lubricant in said pockets lubricates the rounded load bearing ribs, said rounded ribs presenting no sharp edges to the lubricated surface of said one member whereby there is no wiping action which substantially completely removes lubricant from said lubricated surface.

2. A bearing as set forth in claim 1, further characterized by said bushing means forming an open ended sleeve coaxially around said inner member.

3. A bearing as set forth in claim 2, further characterized by load bearing rings integral with said rounded ribs, said rings extending circumferentially around said bushing and together withe said ribs forming a plurality of closed lubricant receiving pockets axially of said bushing and forming a plurality of closed lubricant receiving pockets circumferentially around said bushing.

4. A bearing as set forth in claim 3, further characterized by said pocket sealing means comprising load bearing ring means extending circumferentially around said bushing means at both ends thereof.

References Cited in the file of this patent

UNITED STATES PATENTS

| | | |
|---|---|---|
| Re. 24,758 | Thiry | Dec. 22, 1958 |
| 207,313 | Smith | Aug. 20, 1878 |
| 1,552,645 | Powell | Sept. 8, 1925 |
| 2,324,984 | Brown | July 20, 1943 |
| 2,324,997 | Brown | July 28, 1943 |
| 2,715,766 | Ricks | Aug. 23, 1955 |
| 2,814,538 | Connolly | Nov. 26, 1957 |
| 2,815,253 | Spriggs | Dec. 3, 1957 |
| 2,827,303 | Herbenar | Mar. 18, 1958 |
| 2,892,662 | Scheel | June 30, 1959 |

FOREIGN PATENTS

| | | |
|---|---|---|
| 752,513 | Great Britain | July 11, 1956 |
| 1,204,637 | France | Oct. 10, 1959 |